United States Patent [19]

Mackay et al.

[11] 4,064,274
[45] Dec. 20, 1977

[54] LONG-LASTING FLAVORED CHEWING GUM INCLUDING CHALK-FREE GUM BASE

[75] Inventors: Donald A. M. Mackay, Pleasantville; K. Warren Clark, Brewster; Frank Witzel, Spring Valley, all of N.Y.; Daniel Schoenholz, Basking Ridge, N.J.

[73] Assignee: Life Savers, Inc., New York, N.Y.

[21] Appl. No.: 727,914

[22] Filed: Sept. 29, 1976

Related U.S. Application Data

[63] Continuation-in-part of Ser. No. 654,303, Feb. 2, 1976, abandoned, and Ser. No. 654,122, Feb. 2, 1976, abandoned.

[51] Int. Cl.² ............................................. A23G 3/30
[52] U.S. Cl. ..................................... 426/3; 426/548; 426/804

[56] References Cited

U.S. PATENT DOCUMENTS

| 3,666,492 | 5/1972 | Teng | 426/3 |
| 3,681,087 | 8/1972 | Johnson | 426/3 |
| 3,795,744 | 3/1974 | Ogawa et al. | 426/3 |

Primary Examiner—Jeanette M. Hunter
Attorney, Agent, or Firm—Lawrence S. Levinson; Merle J. Smith; Burton Rodney

[57] ABSTRACT

A flavored chewing gum is provided which contains a water-insoluble chalk-free gum base, a slowly or poorly extractable or poorly water-soluble sweetener in particulate form, such as the free acid form of saccharin or free cyclamic acid, and optionally, a slowly or poorly extractable or poorly water-soluble food acid in particulate form, for example, fumaric acid, dispersed in the gum base. The particulate sweetener and food acid (where present) undergo controlled release from the gum base for relatively long periods during which time the chewing gum delivers a sweet taste unaccompanied by a metallic or bitter after-taste.

37 Claims, No Drawings

LONG-LASTING FLAVORED CHEWING GUM INCLUDING CHALK-FREE GUM BASE

REFERENCE TO OTHER APPLICATIONS

This application is a continuation-in-part of application Ser. No. 654,303, filed Feb. 2, 1976, and application Ser. No. 654,122, filed Feb. 2, 1976, and now both abandoned.

FIELD OF THE INVENTION

The present invention relates to long-lasting non-sour and sour-flavored chewing gums having particulate poorly extractable or poorly soluble sweetener, such as poorly soluble saccharin, for example, its free acid form, and optionally particulate poorly extractable or poorly water-soluble food acid, dispersed in the chalk-free gum base portion thereof.

BACKGROUND OF THE INVENTION

Conventional chewing gum generally includes gum base, water-soluble flavoring and water-soluble sweeteners, for example, various sugars and/or artificial sweeteners such as sodium or calcium saccharin. Such gum initially provides a desirable strong sweet taste which declines rapidly during the first 3 to 5 minutes of chewing to a very slight perceptible level of sweetness and flavor. The result is that after about 5 minutes of chewing all that remains in the mouth is an essentially tasteless wad which provides little in the way of flavor, aroma or sweetness. Furthermore, chewing gum which depends upon the water-soluble forms of saccharin for its sweetness exhibits an undesirably strong sweet taste initially accompanied by an objectionable medicinal and/or bitter after-taste. Accordingly, there clearly is a need and long felt want for a chewing gum which possesses long-lasting flavor without the undesirable medicinal and bitter after-taste which normally accompanies chewing of gum sweetened by the soluble saccharin salts.

DETAILED DESCRIPTION OF THE INVENTION

It has now been found that the sweetness and flavor of non-sour flavored (mint), fruit-flavored or sour chewing gum can be prolonged by incorporating a solid poorly extractable or poorly water-soluble sweetener in particulate form, preferably a poorly water-soluble form of saccharin, and optionally, where sour or fruit flavors are desired, a poorly extractable or poorly water-soluble food acid in particulate form, in a chalk-free gum base during the preparation of the gum, the particulate sweetener and the food acid (where present) being generally employed in the form of fine powders having an average particle size of below about 150 microns (0.150 mm or about 100 mesh). The particulate poorly extractable or poorly water-soluble sweetener and food acid are substantially retained in the chalk-free gum base and during chewing undergo slow and controlled release into the saliva.

It is well known that fine pulverization of crystals of poorly soluble materials or even slowly dissolving materials of even good solubility increases surface area thereof, which, in turn, increases solubility rate. However, it has been surprisingly and unexpectedly found that finely divided artificial sweeteners, such as finely powdered free saccharin acid and finely divided food acids, such as finely divided fumaric acid, when incorporated into chewing gum base do just the opposite; the extraction rates of such sweeteners and food acids from the gum base during chewing are reduced with decreasing particle sizes so that the sweet taste and flavor of the gum are prolonged. The reason for this effect would seem to be that at the finer particle sizes, the sweetener and food acid are more completely protected from contact with saliva by the gum base. This results in controlled release of sweetener and flavor from the gum base.

Poorly water-soluble saccharin such as the free acid form, is quite bitter and has been found to exhibit a bitterness threshold as a function of concentration in the saliva. Unexpectedly, it has been discovered that when such saccharin in finely divided form is incorporated in chewing gum its bitterness is reduced; this is indeed surprising since one would expect a higher concentration of dissolved saccharin as a result of the higher solution rate due to the increased surface area of the fine particle size. Notwithstanding its larger surface area, it appears that at the finer particle size the saccharin is more completely protected from contact with saliva by the gum base so that controlled release of dissolved saccharin below the bitterness threshold is obtained. Furthermore, the presence of poorly extractable saccharin together with the poorly extractable food acid in the gum base, in the form described above, has also been found to enhance the aroma of many fruit flavors.

It is important in the chewing gum of the invention that the free saccharin acid form of the poorly extractable, poorly water-soluble saccharin employed in one embodiment remain in the gum base for as long as possible without being solubilized therefrom. Thus, conversion of the free saccharin acid to a soluble salt such as the calcium or sodium salts of saccharin should be inhibited. However, where conventional gum base compositions, that is, those gum bases containing calcium carbonate (chalk) as a filler and/or texturizing agent are employed in forming the chewing gum, it has been found that the chewing gum tends to lose its sweetness retention properties after a few weeks of shelf storage at room temperature.

The present invention overcomes this difficulty by providing a gum base composition which is substantially free of calcium carbonate, that is, contains less than 5% by weight calcium carbonate, if any, at all. The chalk-free chewing gum base of the invention having particles of free saccharin acid and fruit acid (where present) dispersed therein and when employed in conjunction with the soluble phase as described herein, in accordance with the present invention, will provide a chewing gum which will retain its sweetness and sour flavor for substantially longer periods than heretofore known chewing gums, and in some cases, will retain its sweetness and sour flavor for periods of 30 to 60 minutes and even longer.

The chalk-free chewing gum base of the invention will be present in an amount within the range of from about 10 to about 50%, preferably from about 15 to about 30%, and optimally from about 18 to about 23% by weight of the chewing gum of the invention. Such chalk-free gum base includes one or more elastomers, such as styrene-butadiene copolymer; hard waxes (that is, waxes having a melting point of above about 65° C) such as candelilla wax and paraffin waxes or mixtures thereof; one or more solvents for the elastomers, such as hydrogenated ester gum; one or more hydrophilic-type detackifiers which absorb saliva and become slippery and are incompatible with the elastomer and solvent for the elastomer, such as polyvinyl acetate; one or more softening agents-lubricants, such as hydrogenated vegetable or animal fats having a melting point above about 22° C; and one or more emulsifiers which impart hydrophilic properties to the gum base making the gum base slippery on contact with saliva.

The elastomers which are employed in the gum base include, but are not limited to, masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of gum base composition.

The hard waxes suitable for use in the gum base composition serve as lubricants and should have a melting point of above about 65° C and preferably above about 75° C. Examples of such hard waxes include candelilla wax, paraffin wax, carnauba wax, ozokerite, oricury, microcrystalline wax, and the like. The hard waxes will be employed in an amount within the range of from about 10 to about 50% by weight of the gum base, preferably from about 17 to about 40%, and optimally from about 20 to about 30% by weight. The preferred hard waxes are candelilla wax and paraffin wax employed in combination so that from 2 to about 8% (based on the weight of the gum base) of the candelilla is employed with from about 15 to about 30% (based on the weight of the gum base) of the paraffin wax. The waxes are found to reduce the tackiness of the final gum composition without significantly reducing cohesivity thereof.

The solvent for the elastomer should have minimal tackifying properties and will preferably comprise hydrogenated ester gum, that is, glycerol ester of hydrogenated rosin and/or dimerized ester gum. However, other solvents may be employed such as pentaerythritol ester gum, polymerized ester gum, and ester gum. The solvent will be employed in an amount ranging from about 10 to about 40%, preferably from about 18 to about 30%, and optimally from about 20 to about 25% by weight of the gum base.

The hydrophilic-type detackifier will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers. The hydrophilic-type detackifier will be employed in an amount within the range of from about 20 to about 40% by weight of the gum base, preferably from about 25 to about 35%, and optimally from about 28 to about 32% by weight of the gum base.

The softening agent and lubricant combination which may be employed herein comprises one or more hydrogenated vegetable or animal fats having a high melting point, that is above about 22° C, and preferably above about 50° C, and will be employed in amounts ranging from about 2 to about 15% by weight of the gum base, preferably from about 4 to about 12%, and optimally from about 5 to about 10%.

The emulsifier will impart hydrophilic properties to the gum base so that saliva will be absorbed thereby making the gum base slippery and will be employed in amounts ranging from about 2 to about 12% by weight of the gum base, preferably from about 3 to about 8%, and optimally from about 5 to about 7%. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to 2000 ppm of the gum base, such as butylated hydroxyanisole, butylated hydroxytoluene, and propyl gallate.

The gum base is prepared by heating and/or blending the various ingredients as mentioned above in a manner well known in the art.

A further feature of the present invention comprises a flavored chewing gum including the particulate or poorly extractable or poorly water-soluble sweetener and particulate food acid (where present), incorporated in the gum base, and an easily extractable, for example, water-soluble sweetener, such as sugar and/or polyol, such as sorbitol, a water-soluble saccharin salt or other synthetic water-soluble sweetener, water-soluble food acid (where desired) and a flavoring.

In yet another aspect of the present invention, a method is provided for forming a long-lasting flavored gum, which method includes the steps of admixing melted gum base with a plasticizer such as a syrupy substance such as corn syrup or a modified starch syrup or sorbitol syrups, at a temperature ranging from about 180 to about 210° F, to form a base-syrup mix, (where desired) adding flavor oil to the mix, and during the first five minutes of mixing, admixing the base-syrup with a particulate poorly extractable or poorly water-soluble sweetener, preferably poorly water-soluble saccharin, and optionally a particulate slowly extractable or poorly water-soluble food acid, at a temperature below 250° F so as to inhibit formation of soluble salts, to form a continuous gum mass having the particles of sweetener and food acid (where present) intimately dispersed therein, and thereafter admixing the above mix with one or more easily extractable water-soluble sweeteners, and easily extractable water-soluble flavors. The resulting mix is then formed into sticks or tablets of chewing gum employing conventional techniques.

By following the above procedure the particulate sweetener and particulate food acid (where present) will be incorporated and retained in the gum base and will undergo controlled release in the mouth, in some cases, for periods of up to 30 to 60 minutes or more to provide concentrations of the sweetener below the bitter threshold thereof, but in sufficient amounts to provide a pleasant sweet taste, as well as a pleasant sour taste to balance the sweet taste of the sweetener (where the food acid is present). It will thus be appreciated that the present invention provides a chewing gum and method for making the same wherein controlled release of sweetness and food acid (where present) is obtained without the need for coating, encapsulating, and/or integrating water-insoluble polymeric substances such as polyvinyl esters on to the particles of sweetener and/or other flavoring agents. This can be accomplished because of the very small particle sizes of the particulate poorly water-soluble sweetener and particulate poorly water-soluble food acid (where present) employed herein.

The particulate slowly or poorly extractable sweeteners suitable for use herein may comprise sweeteners, including poorly extractable forms such as poorly water-soluble forms, such as the free acid form of saccharin, free cyclamic acid, and the like, or mixtures of the above, with the free acid form of saccharin being preferred.

The particulate slowly or poorly extractable or poorly water-soluble sweetener will be present in the chewing gum in amounts ranging from about 0.02 to about 2.5% by weight of the chewing gum, and preferably from about 0.1 to about 1.0% by weight of the chewing gum. Moreover, it is essential that the sweetener be in particulate form so that it may be readily mixed into the melted gum base and retained in the finished gum base to undergo controlled release in the mouth. Accordingly, the particulate sweetener will generally have a particle size below about 150 microns (0.15 mm) and preferably below about 100 microns (0.1 mm). Use of free saccharin acid of the above-mentioned average particle size in the concentration range given above, will also reduce the bitter aftertaste associated with such saccharin. Furthermore, in a preferred embodiment, the free saccharin acid employed will be prepared by the so-called "Maumee" process so that it will be substantially free of o-toluene sulfonamide (which has been found to add to the bitter taste of free saccharin acid).

The particulate slowly or poorly extractable food acid component (where present) will preferably comprise fumaric, adipic or succinic acids in particulate form having a particle size of below about 100 microns so that it may be easily dispersed in the gum base together with the particulate slowly or poorly extractable or poorly water-soluble sweetener and be retained therein to undergo controlled release in the mouth. Generally, the chewing gum of the invention will contain from about 0.5 to about 3.5% and preferably from about 1.5 to about 2.5% of particulate food acid by weight of the chewing gum.

As indicated above, the chewing gum of the invention will also include chalk-free gum base, in an amount ranging from about 10 to about 50%, and preferably from about 15 to about 30% by weight of the chewing gum composition.

The chewing gum of the invention may include flavors derived from plants, leaves, flowers, fruits, etc., in an amount ranging from about 0.3 to about 2.0% by weight, and preferably from about 0.5 to about 1.2% by weight of the final gum product. Representative flavor oils of this type include essential oils such as citrus oils, such as, lemon oil, orange oil, lime oil, grapefruit oil, fruit essences such as apple essence, pear essence, peach essence, strawberry essence, apricot essence, raspberry essence, cherry essence, plum essence, pineapple essence, peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen).

Various synthetic mint, mixed fruit or fruit flavors may also be incorporated in the chewing gum of the invention, with or without conventional preservatives.

Where liquid flavors are employed, they may be added to the gum base-syrup mix as in the case of the free saccharin acid, that is, during the first 5 minutes of mixing, before a continuous mass of the gum base has been formed. Furthermore, after the sugar has been mixed in with the grum base, any of the above flavors, in the form of spray dried flavor with or without citric acid may be added.

In order to provide an initial taste or sensation of sourness, the chewing gum of the invention may also preferably contain an easily extractable food acid such as a water-soluble food acid, such as citric acid, tartaric acid or malic acid, in an amount ranging from about 0.3 to about 2.0% by weight, and preferably from about 0.5 to about 1.2% by weight of the final gum product.

The chewing gum of the invention will optionally, and preferably, include an easily extractable or water-soluble sweetener in addition to the poorly extractable sweetener; the easily extractable sweetener being present in an amount ranging from about 90 to about 0.05%, preferably from about 90 to about 40%, and more preferably from about 85 to about 70% by weight of the final product to provide an initial burst of sweetness. Such water-soluble sweeteners may include one or more sugars, sugar alcohols, or sugar containing material, for example, monosaccharides, disaccharides and polysaccharides, some examples of which follow:

A. Monosaccharides of 5 or 6 carbon atoms—arabinose, xylose, ribose, glucose, mannose, galactose, fructose, dextrose, or sorbose or mixtures of two or more of the foregoing monosaccharides.

B. Disaccharides—sucrose such as cane or beet sugar, lactose, maltose or cellobiose; and C. Polysaccharides—partially hydrolyzed starch, dextrin or corn syrup solids.

The sugar alcohols include sorbitol, xylitol or mannitol.

In a preferred embodiment, sorbitol will be included in combination with sugar as the water-soluble sweetener. In such case, the sorbitol will be present in an amount within the range of from about 2 to about 20% by weight of the chewing gum composition, preferably from about 5 to about 15%, and optimally from about 8 to about 12%.

Furthermore, any of the known water-soluble artificial or natural sweeteners, such as soluble saccharin salts, soluble cyclamate salts, soluble chalcones, soluble glycyrrhizic acid salts, and sugar alcohols, may be present together with the particulate poorly extractable sweetener. In each of the preferred embodiments of the chewing gum and method of the invention, corn syrup will be employed as the plasticizer. However, satisfactory results may be obtained, for example, by employing sorbitol syrups, modified starches and the like, without the use of and presence of corn syrup in the chewing gum.

Generally, in forming a preferred embodiment of the chewing gum of the invention, the poorly or slowly extractable (poorly water-soluble) saccharin will be employed in a weight ratio to the easily extractable (water-soluble) sweetener within the range of from about 0.00022:1 to about 20:1 and preferably within the range of from about 0.0011:1 to about 0.025:1.

The chewing gum of the invention may also contain softeners, non-chalk fillers and texturizers, such as hydrated alumina, plasticizers, emulsifiers, F.D. & C. coloring agents, and other conventional chewing gum additives as will be apparent to those skilled in the art.

It will be appreciated that the particulate slowly or poorly extractable sweetener and particulate slowly or poorly extractable food acid (where present) will be incorporated into the oil phase or gum base itself and will provide long lasting sweetness and sourness, whereas the easily extractable (water-soluble) sweeteners, easily extractable (water-soluble) food acids, fruit flavors or other water-soluble flavors will comprise the water-soluble portion of the chewing gum and will provide the initial burst of sweetness, sourness (where present) and flavor.

The following Examples illustrate preferred embodiments of the present invention without, however, limiting the same thereto. All temperatures are expressed in ° F.

EXAMPLE 1

A chalk-free gum base having the composition as set out below is prepared employing conventional gum base making techniques.

|  | Parts by Weight of Gum Base |
|---|---|
| Polyvinyl acetate | 30 |
| Paraffin wax | 18 |
| Ester gum types | 22 |
| Natural waxes | 5 |
| Butylated hydroxy toluene | 1000 parts/ppm of base |
| Elastomer | 10 |
| Glyceryl monostearate | 6 |
| Hydrogenated vegetable fat | 7 |

EXAMPLE 2

A long-lasting peppermint flavor chewing gum is prepared from the following ingredients:

|  | Parts by Weight of Chewing Gum |
|---|---|
| Chalk free gum base (as disclosed in Example 1) | 22 |
| Corn syrup, 44° Be' | 17 |
| Powdered free saccharin acid (pulverized to pass through a U.S. 140 mesh screen) | 0.2 |
| Powdered sugar (sucrose) | 49 |
| Sorbitol | 10 |
| Ester gum | 0.2 |
| Peppermint oil | 0.8 |
| Peppermint (spray-dried) | 1 |
| Lecithin | 0.2 |

The gum base is melted (temperature 270°), cooled to 180° and placed in a standard dough mixer kettle equipped with sigma blades. The corn syrup and lecithin are added and mixed for 2 minutes at 200°. Flavor oil is then added and incorporated into the base. At the time the mix is folding well, powdered free saccharin is added and the mixture is mixed another 2 minutes at 200°. Thereafter, about one half of the sucrose is added and the mixture is mixed for 2 minutes. The sorbitol and remaining sucrose are added, mixed for 1 minute and then spray dried flavor is added and the mixture is mixed for 1 minute. The gum is then discharged from the kettle, cut into 25 lb. loaves and allowed to cool to 90°–120° F. It is then rolled to a thickness of 0.178 cm on a standard Gimpel machine and scored into strips 7.26 cm wide and 41.9 cm long, and cooled for 12–18 hours.

The chewing gum product obtained is found to have a pleasant sweet taste for up to 60 minutes and more without the bitter after-taste normally associated with free saccharin acid.

EXAMPLE 3

A long-lasting peppermint flavored chewing gum is prepared from the following ingredients in a manner similar to that described in Example 2.

|  | Parts by Weight of Chewing Gum |
|---|---|
| Chalk-free gum base (as disclosed in Example 1) | 22 |
| Powdered free saccharin acid (140 mesh) | 0.2 |
| Powdered sugar (sucrose) | 67 |
| Modified food starch | 1 |
| Sorbitol | 9 |
| Lecithin | 0.2 |
| Peppermint oil | 0.7 |
| Ester gum | 0.3 |

The above composition is similar to the composition of Example 1 except that it does not include corn syrup but instead includes modified food starch.

EXAMPLE 4

A long-lasting spearmint flavored chewing gum is prepared from the following ingredients in a manner similar to that described in Example 2.

|  | Parts by Weight of Chewing Gum |
|---|---|
| Chalk-free gum base (as described in Example 1) | 22 |
| Corn syrup, 44° Be' | 17 |
| Powdered free saccharin acid (140 mesh) | 0.2 |
| Powdered sugar (sucrose) | 49 |
| Sorbitol | 10 |
| Lecithin | 0.2 |
| Peppermint oil | 0.2 |
| Spearmint oil | 0.6 |
| Ester gum | 0.2 |
| Spearmint (spray-dried) | 0.5 |

EXAMPLE 5

A long-lasting spearmint flavored chewing gum is prepared from the following ingredients in a manner similar to that described in Example 2.

|  | Parts by Weight of Chewing Gum |
|---|---|
| Chalk-free gum base (as indicated in Example 1) | 22 |
| Powdered sugar (sucrose) | 67 |
| Powdered free saccharin acid (140 mesh) | 0.2 |
| Sorbitol | 9 |
| Lecithin | 0.2 |
| Peppermint oil | 0.2 |
| Spearmint oil | 0.6 |
| Ester gum |  |
| Spearmint (spray dried) | 0.5 |
| Modified food starch | 1 |

The above composition does not include corn syrup but instead includes modified food starch; otherwise it is similar to the composition of Example 4.

EXAMPLE 6

In order to evaluate the chewing gum compositions of the invention containing free saccharin acid dispersed in a chalk-free base against popular commercial chewing gums (Life Savers peppermint and spearmint and Wrigley's doublemint and spearmint) a trained sensory panel tested the compositions of Examples 2 and 4 as well as Life Savers' and Wrigley's gums for sweetness and overall flavor.

A maximum of two samples were tested per day in morning and afternoon sessions. Testing was conducted according to the methods promulgated in ASTM Standards for Sensory Evaluation.

Five panelists, selected from an expert sensory panel, and who have previously participated in this program were used for all tests.

Panelists were given two coded samples of gum and were asked to chew each sample separately for 5 minute periods. At the end of each chewing period, the bolus was Placed in a paper cup. Once the two gums were chewed for equal time periods, panelists were asked to rinse their mouths and were given crackers to eat, thus eliminating residual flavor in the oral cavity. After a 5 minute rest period, panelists were asked to compare the two boluses and to rate each one on a 9 point hedonic scale.

This procedure was continued until the gums were chewed for periods of 10 to 15 and 20 minutes.

Panelists rated the products for the following attributes:

Sweetness: the sweet sensation perceived in the oral cavity

Overall flavor: refers to a combination of taste and aroma sensations as perceived in the oral cavity and by the olfactory sense.

The scale used was as follows:
Scale:
0 = none
2 = slightly perceptible
4 = definite
6 = strong
8 = very strong The tests were carried out on the following dates:
1. Example 2 vs. Life Savers' Peppermint on October 30
2. Example 2 vs. Wrigley's Doublemint on October 30
3. Example 4 vs. Life Savers' Spearmint, October 31
4. Example 4 vs. Wrigley's Spearmint, November 6

The average scores obtained are given in Tables 1 and 2.

Table 1

| | Average Scores of Peppermint Gums | | | |
|---|---|---|---|---|
| | Example 2 | | Life Savers | |
| Time | Sweetness | Overall Flavor | Sweetness | Overall Flavor |
| 5 | 5.0 | 4.2 | 2.4 | 3.2 |
| 10 | 3.8 | 3.4 | 1.0 | 2.0 |
| 15 | 3.2 | 2.6 | 0.2 | 1.0 |
| 20 | 2.6 | 2.2 | 0.2 | 0.6 |
| | Example 3 | | Wrigley's | |
| 5 | 5.3 | 4.5 | 3.2 | 2.8 |
| 10 | 3.5 | 3.3 | 0.8 | 1.3 |
| 15 | 3.0 | 2.4 | 0.3 | 0.5 |
| 20 | 2.5 | 2.0 | 0.0 | 0.3 |

Table 2

| | Average Scores of Spearmint Gum | | | |
|---|---|---|---|---|
| | Example 4 | | Life Savers | |
| Time | Sweetness | Overall Flavor | Sweetness | Overall Flavor |
| 5 | 4.8 | 4.2 | 2.2 | 3.0 |
| 10 | 3.8 | 3.8 | 0.8 | 1.6 |
| 15 | 3.2 | 2.8 | 0.4 | 1.0 |
| 20 | 2.8 | 2.2 | 0.0 | 0.6 |
| | Example 4 | | Wrigley's | |
| 5 | 4.4 | 3.8 | 2.4 | 2.8 |
| 10 | 3.8 | 3.4 | 1.0 | 1.4 |
| 15 | 3.2 | 3.2 | 0.6 | 1.0 |
| 20 | 2.8 | 3.0 | 0.6 | 0.8 |

The results clearly indicate that both the peppermint and spearmint gum examples of the invention were significantly superior to the controls (Life Savers' and Wrigley's).

EXAMPLE 7

In order to evaluate the chewing gum compositions of the invention containing free saccharin acid dispersed in chalk free base (as per Example 2) and chewing gum compositions containing free saccharin acid dispersed in chalk containing base (the composition being similar to that of Example 2 except that the gum base included chalk—18% of base) [Control X], against chewing gum of the composition similar to control X except that the free saccharin acid is replaced with equivalent amounts of the sodium saccharin salt (Control Y) and calcium saccharin salt (Control Z) the percent saccharin remaining in the bolus after chewing for prescribed time intervals, was determined.

The saccharin was first extracted from the bolus, and the ultra violet spectrum of the solution was run on a suitable dilution and the absorbance at 203 m was determined and compared with a standard curve. The results are expressed as percent of the original saccharin remaining in the bolus and are summarized below:

Table 3

| | Percent Saccharin Retained | | | |
|---|---|---|---|---|
| | Example 2 | Control X | Control Y | Control Z |
| Chewing Time | Free Saccharin acid, chalk-free base | Free Saccharin acid, chalk-containing base | Sodium Saccharin Chalk Base | Calcium Saccharin Chalk Base |
| After 5 minutes | 47.8 | 26.4 | 10.1 | 5.3 |
| After 10 minutes | 29.0 | 21.0 | 5.5 | 3.3 |
| After 15 minutes | 15.1 | 15.1 | — | — |
| After 20 minutes | 12.0 | 6.5 | — | — |
| After 30 minutes | 7.7 | — | — | — |

These results, clearly indicate that chewing gum with free saccharin acid and chalk free base, retained the highest level of sweetening agent in the bolus. They also clearly indicate that the use of free saccharin acid in a chalk containing base results in a major improvement in the longer lasting properties of the sweetness compared to the use of saccharin salts. While, the use of chalk-free base introduces additional significant improvement over the chalk-containing base.

It is well accepted that the sweetness of saccharin is approximately 300 times the sweetness of sugar. Taking this into account these data demonstrate that the residual sucrose equivalent sweetness in the boluses is as follows:

15% sucrose equivalent in gums containing free saccharin acid and chalk-free base (Example 2) after 30 minutes of chewing 12% sucrose equivalent in gums containing free saccharin acid and chalk-containing base (Control X) after 20 minutes of chewing 9% in gums containing the sodium salt of saccharin (Control Y) after 10 minutes of chewing 0.6% in gums containing the calcium salt of saccharin (Control Z) after 10 minutes of chewing In addition to the above, the sucrose and total sugars were extracted and determined by gas chromatography. The rate of extraction was the same for all gums and was found to be as follows:

| Minutes of Chewing | Percent sucrose and corn syrup retained in boluses | |
|---|---|---|
|  | Corn Syrup | Sucrose |
| 5 | 4.7 | 6.4 |
| 10 | 2.4 | 1.8 |
| 15 | 0.5 | 0.6 |

These data clearly indicate that the gum produced in accordance with this invention exhibits greater sweetness retention, as compared with the sweetness retention of gums sweetened with conventional water soluble sweeteners.

EXAMPLE 8

A long-lasting cherry flavored chewing gum is prepared from the following ingredients:

|  | Parts by Weight of Chewing Gum |
|---|---|
| Chalk-free gum base (as described in Example 1) | 22 |
| Corn syrup, 44° Be' | 15 |
| Powdered free saccharin acid (pulverized to pass through a U.S. 140 mesh screen) | 0.3 |
| Citric acid | 0.7 |
| Fumaric acid | 2 |
| Powdered sugar (sucrose) | 46 |
| Sorbitol | 10 |
| Ester gum | 0.2 |
| Cherry oil | 0.8 |
| Cherry (spray-dried) | 2 |
| Lecithin | 0.2 |

The gum base is melted (temperature 270°), cooled to 180°, and placed in a standard dough mixer kettle equipped with sigma blades. The corn syrup and lecithin are added and mixed for 2 minutes at 200°. Flavor oil is then added and incorporated into the base. At the time the mix is folding well, powdered free saccharin and fumaric acid are added and the mixture is mixed another 2 minutes at 200°. Thereafter, about one-half of the sucrose is added, and the mixture is mixed for 1½ minutes. The sorbitol and remaining sucrose are added, mixed for 1 minute and then citric acid and spray dried flavor are added and the mixture is mixed for 1 minute. The gum is then discharged from the kettle, cut into 25 lb. loaves and allowed to cool to 90°-120° F. It is then rolled to a thickness of 0.178 cm on a standard Gimpel machine and scored into strips 7.26 cm wide and 41.9 cm long, and cooled for 12-18 hours.

The chewing gum product obtained is found to have a pleasant sweet taste for up to 60 minutes and more without the bitter after-taste normally associated with free saccharin acid.

EXAMPLE 9

A long-lasting cherry flavored chewing gum is prepared from the following ingredients in a manner similar to that described in Example 8.

|  | Parts by Weight of Chewing Gum |
|---|---|
| Chalk-free gum base (as disclosed in Example 1) | 22 |
| Powdered free saccharin acid (140 mesh) | 0.2 |
| Powdered sugar (sucrose) | 62 |
| Modified food starch | 1 |
| Sorbitol | 9 |
| Citric acid | 0.8 |
| Fumaric acid | 2 |
| Lecithin | 0.2 |
| Cherry oil | 0.8 |
| Ester gum | 0.2 |
| Cherry (spray dried) | 2 |

The above composition includes modified food starch insted of corn syrup, but otherwise is similar to the composition of Example 8.

EXAMPLE 10

In order to evaluate the chewing gum composition of the invention containing free saccharin acid dispersed in a chalk-free base against popular commercial chewing gums (Life Savers Cherry Gum and Adams Sour Cherry Gum), a trained sensory panel tested for compositions of Examples 8 and 9 as well as Life Savers Cherry and Adams Sour Cherry Gums for taste, flavor and overall quality, as defined below.

In all tests, the number of judges ranged between a minimum of eight and a maximum of 10 selected from an expert panel pool.

A maximum of two samples were tested per day in morning and afternoon sessions. In each session half of the panel received an experimental sample (Examples 2 and 3) and the other half received one of the controls (Life Savers Cherry Gum or Adams Sour Cherry Gum). Samples were coded in double digit random numbers so that judges could not identify the samples.

Chewing gums were rated on a 1 to 9 point hedonic scale for the following flavor attributes:

Sweetness: The sweet sensation perceived in the oral cavity.

Sourness: The sour sensation perceived in the oral cavity.

Cherry Aroma: The cherry aroma as perceived in the oral cavity and olfactory cells.

EVALUATION OF FLAVORED CHEWING GUMS

SCALE:
 1 = Imperceptible.
 3 = Perceptible.
 5 = Definite.
 7 = Strong.
 9 = Very strong.

The testing was carried out on the dates specified in the following Table 4.

TABLE 4

| Gum | No. of Judges | Date Tested |
|---|---|---|
| Example 8 | 9 | September 30 |
| Example 9 | 8 | September 26 |
| Life Savers' Wild Cherry | 8 | September 26 |
| Adams Sour Cherry | 10 | September 25 |

Results and Discussion

The average scores obtained from panel tests are given in Table 5.

TABLE 5

AVERAGE PANEL SCORES OF CHERRY GUMS

| Attribute | Sample | Time (Min.) | | | | | | |
|---|---|---|---|---|---|---|---|---|
| | | 1 | 3 | 5 | 10 | 15 | 20 | 30 |
| Sweetness | Example 8 | 6.8 | 5.3 | 4.2 | 2.9 | 2.2 | 1.8 | 1.4 |
| | Example 9 | 6.9 | 4.9 | 3.8 | 2.8 | 2.1 | 1.6 | 1.4 |
| | Adams | 6.3 | 4.6 | 3.4 | 2.1 | 1.8 | 1.2 | 1.2 |
| | Life Savers' | 6.3 | 4.6 | 3.3 | 2.0 | 1.1 | 1.0 | 1.0 |
| Sourness | Example 8 | 7.1 | 5.7 | 4.6 | 3.7 | 2.9 | 2.4 | 1.9 |
| | Example 9 | 7.1 | 5.0 | 4.4 | 3.1 | 2.4 | 2.0 | 1.9 |
| | Adams | 8.5 | 5.9 | 3.9 | 2.5 | 1.9 | 1.3 | 1.3 |
| | Life Savers' | 7.6 | 4.4 | 2.6 | 1.9 | 1.4 | 1.3 | 1.1 |
| Cherry Aroma | Example 8 | 6.8 | 6.1 | 4.8 | 4.0 | 3.2 | 2.8 | 2.2 |
| | Example 9 | 7.1 | 6.0 | 4.9 | 3.8 | 3.1 | 2.6 | 2.3 |
| | Adams | 6.6 | 5.5 | 4.1 | 2.7 | 2.3 | 1.9 | 1.8 |
| | Life Savers' | 7.0 | 5.1 | 3.5 | 2.4 | 1.8 | 1.6 | 1.6 |

Analysis of the data on the four samples of cherry gums tested indicates that:

The panel noted no significant difference in Sweetness between the Example 8 and 9 gums and these were both sweeter than Life Savers' and Adams gums. The overall averages for sweetness for the four products were:

| | Example 8 | 3.5 |
|---|---|---|
| | Example 9 | 3.3 |
| Controls { | Life Savers | 2.8 |
| | Adams | 2.9 | with an LSD (95% significance level) of 0.4. Thus, the Example 8 product was significantly sweeter than both controls and the Example 9 product was at the point of significance from Adams gum and significantly sweeeter than Life Savers' Wild Cherry Gum.

The panel noted a significant difference in Sourness between the Examples 8 and 9 gums, with superior lasting sourness to the sample containing corn syrup. The corn syrup containing sample was significantly better than both controls.

What is claimed is:

1. A flavored chewing gum having a prolonged sweet taste comprising a substantially chalk-free gum base, and from about 0.02 to about 2.5% by weight of a particulate slowly extractable sweetener, said sweetener comprising free acid form of saccharin, free cyclamic acid or mixtures thereof, dispersed in said chalk-free gum base, said gum base containing less than 5% by weight calcium carbonate.

2. The flavored chewing gum as defined in claim 1 wherein said particulate slowly or poorly extractable food acid has a particle size of less than about 150 microns.

3. The flavored chewing gum as defined in claim 1 wherein said chalk-free gum base comprises from about 10 to about 50% by weight of the chewing gum.

4. The chewing gum as defined in claim 1 wherein said gum base contains less than about 1% by weight calcium carbonate.

5. The chewing gum as defined in claim 1 wherein said gum base is substantially free of calcium carbonate.

6. The flavored chewing gum as defined in claim 1 wherein said particulate slowly extractable sweetener comprises the free acid form of saccharin.

7. The flavored chewing gum as defined in claim 6 wherein said free acid form of saccharin is present in an amount within the range of from about 0.1 to about 1.0% by weight and is substantially free of o-toluene sulfonamide.

8. The flavored chewing gum as defined in claim 6 wherein said free acid form of saccharin is in the form of finely ground particles having an average particle size of below about 150 microns.

9. The flavored chewing gum as defined in claim 6 wherein said free acid form of saccharin is in the form of finely ground particles having an average particle size of below about 100 microns.

10. The flavored chewing gum as defined in claim 1 further including flavoring.

11. The flavored chewing gum as defined in claim 10 wherein said flavoring comprises essential or synthetic oils.

12. The flavored chewing gum as defined in claim 1 further including from about 0.5 to about 3.5% by weight of a particulate slowly or poorly extractable food acid dispersed in said gum base.

13. The flavored chewing gum as defined in claim 12 wherein said particulate slowly or poorly extractable food acid comprises a poorly water-soluble food acid.

14. The flavored chewing gum as defined in claim 13 wherein said poorly water-soluble food acid is selected from the group consisting of fumaric acid, adipic acid or succinic acid.

15. The flavored chewing gum as defined in claim 1 further including from about 0.05 to about 90% by weight of an easily extractable acid selected from the group consisting of citric, tartaric or malic acid alone or in combination with a natural or synthetic fruit flavoring.

16. The flavored chewing gum as defined in claim 1 further including from about 0.05 to about 90% by weight of one or more easily extractable water-soluble sweetening or bulking agents.

17. The flavored chewing gum as defined in claim 16 wherein the free acid form of saccharin is employed in a weight ratio to the water-soluble sweetener within the range of from about 0.00022:1 to about 20:1.

18. The flavored chewing gum as defined in claim 16 wherein said easily extractable sweetening agent is selected from the group consisting of sugars, water-soluble saccharin salts, dipeptide based sweeteners and cyclamates.

19. The flavored chewing gum as defined in claim 16 wherein said water-soluble sweetening agent comprises sorbitol, xylitol or mannitol.

20. The chewing gum as defined in claim 19 wherein one of said water-soluble sweetening agents is xylitol.

21. The flavored chewing gum as defined in claim 16 wherein said water-soluble sweetening agent is sucrose.

22. The flavored chewing gum as defined in claim 16 comprising gum base, free saccharin acid as the particulate poorly extractable sweetener having a particulate size of below about 150 microns and present in an amount ranging from about 0.1 to about 1.0% by weight, sorbitol, sucrose and corn syrup as water soluble sweetening agent, with or without a particulate slowly or poorly extractable food acid selected from the group consisting of fumaric acid, adipic acid or succinic acid.

23. The flavored chewing gum as defined in claim 22 wherein said sorbitol is present in an amount within the range of from about 2 to about 20% by weight of the chewing gum, said sucrose is present in an amount within the range of from about 40 to about 90% by weight of said chewing gum and said corn syrup is present in an amount within the range of from about 1 to about 25% by weight of said chewing gum.

24. The flavored chewing gum as defined in claim 1 wherein said chalk-free gum base is comprised of one or more elastomers in an amount within the range of from about 10 to about 40% by weight of the gum base; one or more hard waxes having a melting point above about 65° C in an amount within the range of from about 10 to about 50% by weight of the gum base; one or more solvents for the elastomer present in an amount within the range of from about 10 to about 40% by weight of the gum base; one or more hydrophilic-type detackifiers present in an amount within the range of from about 20 to about 40% by weight of the gum base; one or more softening agents present in an amount within the range of from about 2 to about 15% by weight of the gum base, and one or more emulsifiers present in an amount within the range of from about 2 to about 15% by weight of the gum base; said gum base containing 0 to 1% by weight calcium carbonate.

25. The flavored chewing gum as defined in claim 24 wherein said elastomer comprises styrene-butadiene copolymer, said hard waxes comprise paraffin wax and candelilla wax, said solvent comprises hydrogenated ester gum and/or dimerized ester gum, said hydrophilic-type detackifier comprises polyvinyl acetate, said softening agent comprises hydrogenated vegetable fat, and said emulsifier comprises glyceryl monostearate.

26. Chewing gum base containing poorly extractable particulate sweetener dispersed therein comprising the free acid form of saccharin, free cyclamic acid or mixtures thereof, said base containing less than 5% by weight calcium carbonate, said sweetener being present in a weight ratio of gum base within the range of from about 1:4 to about 1:2500.

27. The chewing gum base as defined in claim 26 wherein said sweetener is a poorly water-soluble form of saccharin comprising free saccharin acid.

28. The chewing gum as defined in claim 26 further including a poorly extractable food acid.

29. The chewing gum base as defined in claim 26 wherein said gum base is comprised of one or more elastomers in an amount within the range of from about 10 to about 40% by weight of the gum base; one or more hard waxes having a melting point above about 65° C in an amount within the range of from about 10 to about 50% by weight of the gum base; one or more solvents for the elastomer present in an amount within the range of from about 10 to about 40% by weight of the gum base; one or more hydrophilic-type detackifiers present in an amount within the range of from about 20 to about 40% by weight of the gum base; one or more softening agents present in an amount within the range of from about 2 to about 15% by weight of the gum base; one or more emulsifiers present in an amount within the range of from about 2 to about 15% by weight of the gum base; said gum base being free of calcium carbonate.

30. The flavored chewing gum as defined in claim 29 wherein said elastomer comprises styrene-butadiene copolymer, said hard waxes comprise paraffin wax and candelilla wax, said solvent comprises hydrogenated ester gum and/or dimerized ester gum, said hydrophilic-type detackifier comprises polyvinyl acetate, said softening agent comprises hydrogenated vegetable fat, said emulsifier comprises glyceryl monostearate.

31. A method for forming a flavored chewing gum as defined in claim 1, which comprises admixing melted gum base with a plasticizer for syrupy substance at a temperature ranging from about 180° to about 210° F to form a base-syrup mix, and within the first five minutes of mixing, admixing the base-syrup mix with a poorly water-soluble free saccharin acid at a temperature below about 250° F so as to inhibit formation of soluble saccharin salts and to form a continuous mass.

32. The method as defined in claim 31 including admixing the base-syrup mix with a particulate poorly water-soluble food acid during the first five minutes of mixing.

33. The method as defined in claim 31 including the step of adding flavor oil to the base-syrup mix before adding free saccharin acid.

34. The method as defined in claim 31 including the step of admixing said continuous mass with one or more water-soluble sweeteners.

35. The method as defined in claim 34 wherein the water-soluble sweetener is sucrose and further including the step of adding sorbitol to the mix after a portion of the sucrose has been added to the mix.

36. The method as defined in claim 35 further including the step of adding spray dried flavor to the final mix.

37. The method as defined in claim 31 including the step of admixing said continuous mass with one or more water-soluble flavors.

* * * * *

UNITED STATES PATENT OFFICE
CERTIFICATE OF CORRECTION

Patent No. 4,064,274                    Dated December 20, 1977

Inventor(s) Donald A. M. Mackay

It is certified that error appears in the above-identified patent and that said Letters Patent are hereby corrected as shown below:

Column 4, line 24, before "sugar" insert --a--.
Column 6, line 3, "grum" should read --gum--.
Column 12, line 20, "insted" should read --instead--.
Column 13, first line of Claim 2, "claim 1" should read
  --claim 13--.
Column 16, line 22, "for" should read --or--.

Signed and Sealed this

Twenty-second Day of August 1978

[SEAL]

Attest:

RUTH C. MASON
Attesting Officer

DONALD W. BANNER
Commissioner of Patents and Trademarks